(12) United States Patent
Rutherford et al.

(10) Patent No.: US 8,584,620 B2
(45) Date of Patent: Nov. 19, 2013

(54) OVERMOLDED PET TOY

(75) Inventors: Ryan Rutherford, Belleville, NJ (US); Norman Anderson, Brooklyn, NY (US)

(73) Assignee: JW Pet Company, Inc., Teterboro, NJ (US)

( * ) Notice: Subject to any disclaimer, the term of this patent is extended or adjusted under 35 U.S.C. 154(b) by 0 days.

(21) Appl. No.: 13/489,692

(22) Filed: Jun. 6, 2012

(65) Prior Publication Data

US 2013/0019812 A1 Jan. 24, 2013

Related U.S. Application Data (60) Provisional application No. 61/510,269, filed on Jul. 21, 2011, provisional application No. 61/537,854, filed on Sep. 22, 2011.

(51) Int. Cl.
*A01K 29/00* (2006.01)

(52) U.S. Cl.
USPC .......................................... 119/707; 119/710

(58) Field of Classification Search
USPC ......... 119/707, 702, 708, 709, 710; D30/160; 446/183
See application file for complete search history.

(56) References Cited

U.S. PATENT DOCUMENTS

| | | | |
|---|---|---|---|
| 1,534,964 A | 4/1925 | Kahnweiler | |
| 2,086,631 A | 7/1937 | Munro | |
| D188,179 S | 6/1960 | Tay | |
| 3,028,704 A * | 4/1962 | Rumbaugh | 446/168 |
| 3,135,512 A * | 6/1964 | Taylor | 273/109 |
| 3,519,273 A * | 7/1970 | Viby | 473/594 |
| 4,451,038 A | 5/1984 | Nagy | |
| 4,595,369 A | 6/1986 | Downs | |
| 4,720,283 A * | 1/1988 | Williams et al. | 446/69 |
| 5,758,604 A * | 6/1998 | Jørgensen | 119/711 |
| 5,813,366 A | 9/1998 | Mauldin, Jr. | |
| 5,819,690 A | 10/1998 | Brown | |
| 5,947,061 A | 9/1999 | Markham et al. | |
| 5,965,182 A | 10/1999 | Lindgren | |
| 6,073,581 A | 6/2000 | Wang | |
| 6,098,571 A | 8/2000 | Axelrod et al. | |
| 6,129,053 A | 10/2000 | Markham et al. | |

(Continued)

FOREIGN PATENT DOCUMENTS

| | | |
|---|---|---|
| WO | 95/35137 | 12/1995 |
| WO | 98/52424 | 11/1998 |

OTHER PUBLICATIONS

Treat Dispensing Pickle Pocket downloaded from http://www.aboutdogtraining.com/product/1607/Treat-Dispensing-Pickle-Pocket.html on Jul. 11, 2012.

(Continued)

*Primary Examiner* — Yvonne Abbott
(74) *Attorney, Agent, or Firm* — Eckert Seamans Cherin & Mellott, LLC; Brij K. Agarwal (57) ABSTRACT

A pet toy comprising, in one embodiment, a body have an outer surface, an interior and at least one opening in the outer surface extending into the interior, an overmold supported by the body, and a portion of the overmold extending substantially over the at least one opening and further comprising an inwardly deflectable passage to provide access to the interior therethrough. The interior, in one embodiment, may be provided with a plurality of baffles that create a spiral path.

28 Claims, 10 Drawing Sheets

(56) References Cited

U.S. PATENT DOCUMENTS

| | | | |
|---|---|---|---|
| 6,158,391 A | 12/2000 | Simonetti | |
| 6,167,841 B1 | 1/2001 | Ho | |
| 6,202,598 B1 * | 3/2001 | Willinger | 119/709 |
| 6,217,408 B1 | 4/2001 | Willinger | |
| 6,237,538 B1 | 5/2001 | Tsengas | |
| 6,427,634 B1 | 8/2002 | Mann | |
| 6,485,349 B1 | 11/2002 | Snyder et al. | |
| 6,526,912 B1 | 3/2003 | Ottoson | |
| 6,557,496 B2 | 5/2003 | Herrenbruck | |
| D494,716 S | 8/2004 | Chang | |
| D499,146 S * | 11/2004 | Liu et al. | D20/7 |
| 7,082,895 B2 | 8/2006 | Barney et al. | |
| 7,246,574 B2 | 7/2007 | Renforth | |
| D552,307 S | 10/2007 | Renforth et al. | |
| 7,389,748 B2 | 6/2008 | Shatoff et al. | |
| D579,157 S | 10/2008 | Edwards | |
| 7,506,613 B2 | 3/2009 | Wolfe, Jr. et al. | |
| 7,555,997 B2 | 7/2009 | Wolfe, Jr. et al. | |
| 7,591,234 B2 | 9/2009 | Shatoff et al. | |
| 7,600,488 B2 | 10/2009 | Mann | |
| 7,640,894 B2 | 1/2010 | Jager | |
| 7,681,763 B2 | 3/2010 | McGuyer | |
| 7,866,281 B2 | 1/2011 | Willinger | |
| 8,127,720 B2 * | 3/2012 | Willinger | 119/709 |
| D658,817 S | 5/2012 | Costello et al. | |
| 8,192,776 B2 * | 6/2012 | Vardy et al. | 426/512 |
| 2006/0254531 A1 * | 11/2006 | Willinger | 119/710 |
| 2007/0022971 A1 * | 2/2007 | Renforth et al. | 119/707 |
| 2008/0121190 A1 | 5/2008 | Moulton | |
| 2009/0000565 A1 | 1/2009 | Bryce | |
| 2009/0038560 A1 | 2/2009 | Markham | |
| 2011/0000441 A1 | 1/2011 | Wotmann et al. | |
| 2011/0083608 A1 | 4/2011 | Markham et al. | |
| 2011/0139815 A1 | 6/2011 | Benson | |
| 2011/0214617 A1 | 9/2011 | Markham | |
| 2012/0012068 A1 | 1/2012 | Costello | |

OTHER PUBLICATIONS

Bob-A-Lot downloaded from http://aboutdogtraining.sitestreet.com/199/Bob-A-Lot.htm on Jul. 11, 2012.

Funkitty Egg-Cersizer downloaded from http://www.premier.co/View.aspx?page=cats/products/toys/funkitty/egg/description on Jul. 11, 2012.

Kibble Nibble downloaded from http://www.premier.com/View.aspx?page=dogs/products/toys/busybuddy/kibblenibbletoys on Aug. 6, 2012.

Magic Mushroom downloaded from http://www.premier.com/View.aspx?page=dogs/products/behavior/busybuddy/magicmushroom on Aug. 6, 2012.

Orka Jack downloaded from http://www.petstages.com/product.php?Product_Index=26 on Aug. 6, 2012.

Kong Classic downloaded from http://www.kongcompany.com/products/for-dogs/rubber-toys/classic-rubber-toys/classic-2 on Aug. 6, 2012.

Orka Tennis Ball downloaded from http://www.petstages.com/product.php?Product_Index=30 on Aug. 6, 2012.

* cited by examiner

OVERMOLDED PET TOY

CROSS-REFERENCE TO RELATED APPLICATIONS

This application claims the benefit under 35 USC §119(e) from U.S. Application 61/510,269, filed Jul. 21, 2011, and from U.S. application Ser. No. 61/537,854, filed Sep. 22, 2011, the contents of each of which are incorporated herein by reference.

FIELD OF THE INVENTION

The present invention relates to a pet toy generally, and more particularly to, in one embodiment, a treat dispenser having an overmolded treat insertion passage.

BACKGROUND

The prior art provides pet toys that dispense animal treats when the toy is rolled or otherwise manipulated. Such structures have a variety of forms and arrangements of holes and openings. These treat-discharging toys are generally comprised of a first opening for the insertion of treats, one or a plurality of second openings for the dispensing of treats, which second opening or openings may or may not be the same as the first opening, and a challenge feature that retains the treats within the toy until the toy is played with by the pet. The challenge feature could be, for example, an obstructed interior between the first and one or more second openings that causes a treat to rattle around in response to movement of the toy from the pet. Another challenge feature could, for example, hold the treat in one location that is only accessible if the pet chews or licks the toy.

Despite the advancements in the art, there is always a need for a treat dispenser which sustains a pets' attention for longer periods of time to entice the pet to play and maintain prolonged engagement and interest in the toy. Many pets have a relatively short attention span and are easily bored. What is needed is a new type of treat dispenser which dispenses treats differently from the prior art, thereby sparking a pet's interests for longer periods of time.

SUMMARY

In accordance with one embodiment, a pet toy is provided with a body having an outer surface, an interior and a first opening in the outer surface that extends into the interior. An overmold is provided and supported by the body and includes a first portion that extends substantially over the first opening to form an inwardly deflectable passage for providing access to the interior. The pet toy is also preferably provided with at least one additional opening having a periphery, and a second portion of the overmold extends around the periphery of the one additional opening but preferably does not occlude the same. In one embodiment, a pet toy is provided with an interior having a plurality of baffles, wherein a spiral path is defined through the baffles.

DETAILED DESCRIPTION OF THE PREFERRED EMBODIMENTS

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality.

FIGS. 1-10 illustrate one embodiment of a pet toy 100 having a body 110 with an outer surface 120 formed from a first material 122, an interior 130, a first opening 140 in the outer surface 120 of the body 110 provided for the insertion of treats 50 (FIG. 9) into the interior 130, a second opening 150 in the outer surface 120 provided for the dispensing of treats 50 from the interior 130, and an overmold 200 formed from a second material 202 that is supported by the body 110. A treat 50 as used herein and for purposes of this disclosure is meant to include all animal foodstuffs that can be consumed by an animal, and may take various forms such as uniformly sized nuggets, or a treat may be irregularly sized and shaped. While the present disclosure describes an animal treat dispensing pet toy, it will be appreciated that the toy may be used to dispense other types of treats to other than pets or animals if desired. In addition, while first and second openings 140 and 150 are described, other configurations are possible including having only one opening (not shown) or having more than two openings (not shown).

In a preferred embodiment, the body 110 is formed from a first material 122 that is harder that the second material 202 forming the overmold 200 for providing a structural foundation for the overmold 200. In one non-limiting embodiment, the body 110 is formed from a thermoplastic that is relatively hard, such as polypropylene for example, while the overmold 200 is formed from a softer material 202 such as a thermoplastic elastomer (TPE), for example, with a lower durometer than that of the body 110. Other materials are possible. A softer overmold 200 is useful for gripping and handling by the pet owner, and also assists with bouncing if the toy 100 is thrown or dropped. A softer material also absorbs an impact better than a harder material, which may extend the life of the toy 100. While is it preferable that the first and second materials 122 and 202 are different in composition and appearance, such materials may have the same composition with a different appearance, or such materials may have the same composition and appearance. Other variations are possible.

In one embodiment, the body 100 is initially manufactured in two halves 110a and 110b (FIG. 7) that are joined such as by sonic welding, for example, although more than two body segments may be used during the construction of the body if desired. Other methods of joining, such as with an epoxy, adhesive or the like, are also possible. The overmold 200 may be similarly formed in two halves 200a and 200b (FIG. 8) and respectively applied to the body halves 110a and 110b prior to joining, although more than two segments may also be used if desired. Alternatively, the overmold 200 may be applied to the body 100 in a single molding step. Other methods of manufacture are possible. In the illustrated embodiment, the overmold 200 preferably creates the appearance of a framework version of the body 110 that extends both laterally and longitudinally around the body 110. In the illustrated embodiment, the overmold 200 exhibits the shape of a spiral (see FIG. 8). In other embodiments (not shown), the overmold 200 may exhibit a different shape relative to the body 110.

In the illustrated embodiment, the overmold 200 is applied differently relative to the first and second openings 140 and 150, although alternative embodiments are possible where the overmold is applied similarly relative to the first and second openings 140 and 150. In the illustrated embodiment, a first portion 210 of the overmold 200 extends substantially over the first opening 140 and is supported by a periphery 142 of the first opening 140, while a second portion 220 of the overmold 200 extends substantially around a periphery 152 of the second opening 150 but preferably does not occlude the second opening 150. While the first portion 210 of the overmold 200 is shown to partially occlude the first opening 140, it will be appreciated that the extent of such occlusion can vary, and it will also be appreciated that the second portion 220 of the overmold can similarly partially occlude the second opening 150 if desired, with such level of occlusion being the same or different from the level of occlusion provided by the first portion 210 of the overmold 200 over the first opening 140.

Figure 1:
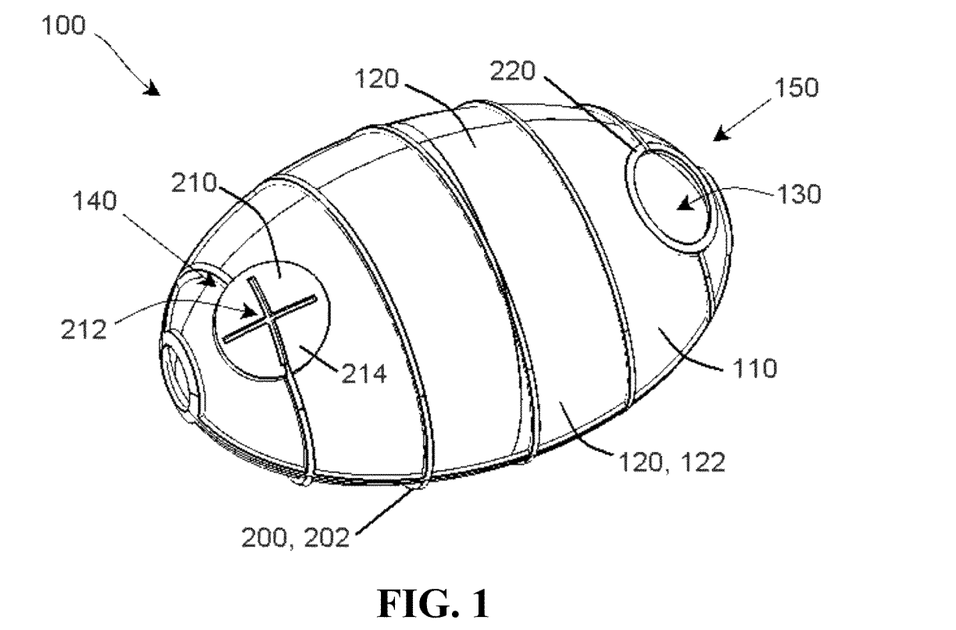
FIG. 1 is one embodiment of a front perspective view of an overmolded pet toy of the present disclosure.
Figure 2:
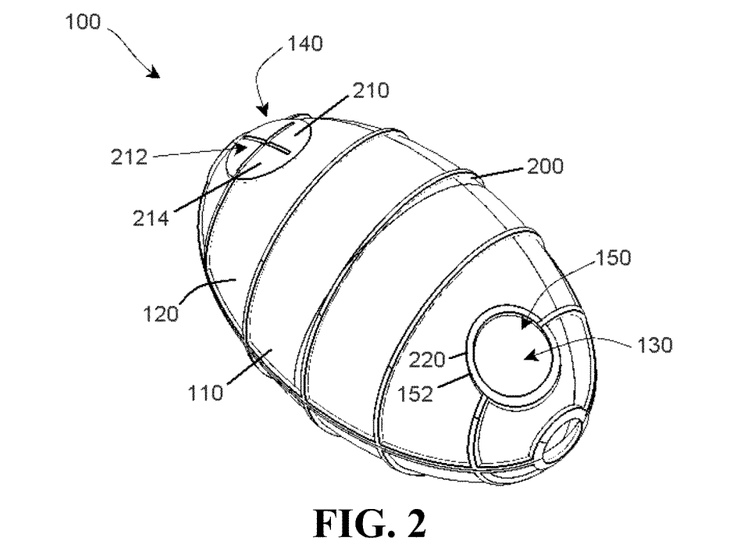
FIG. 2 is a rear perspective view thereof.
Figure 3:
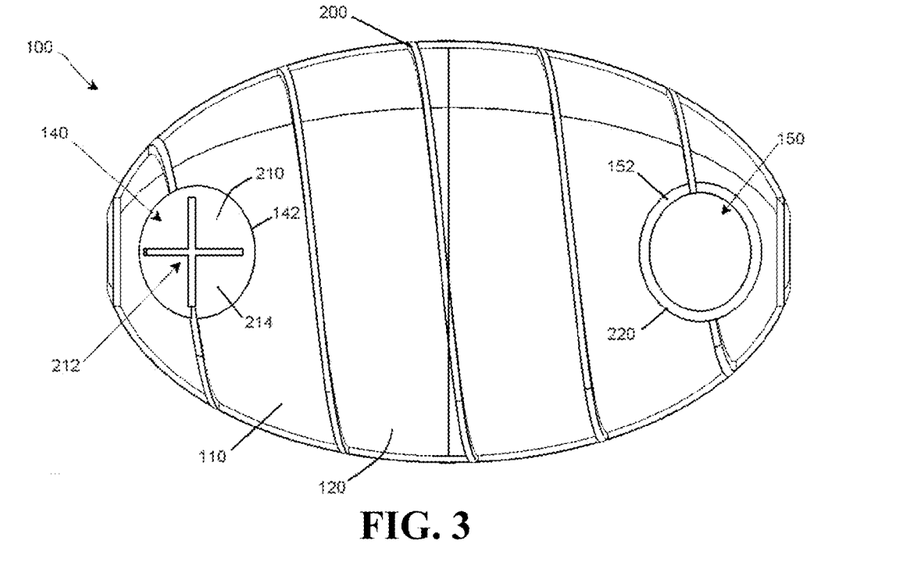
FIG. 3 is a top view thereof.
Figure 4:
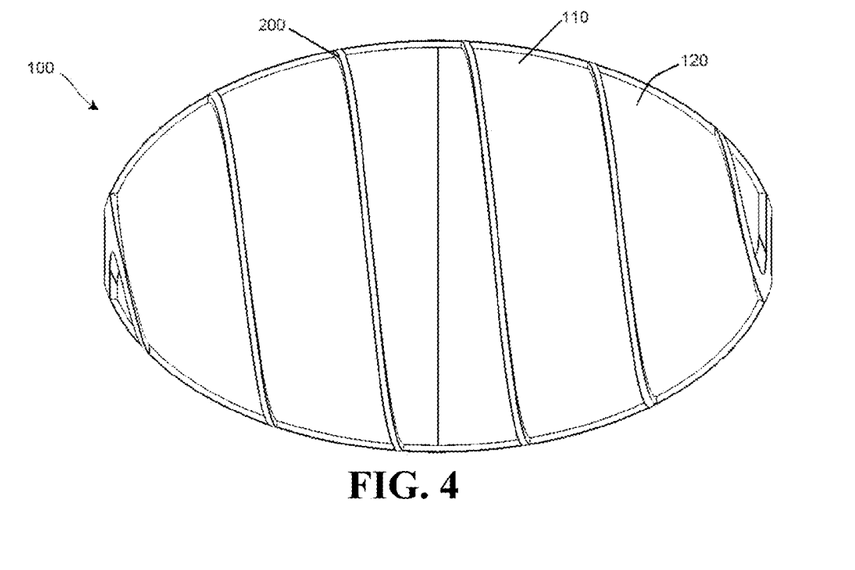
FIG. 4 is a bottom view thereof.
Figure 5:
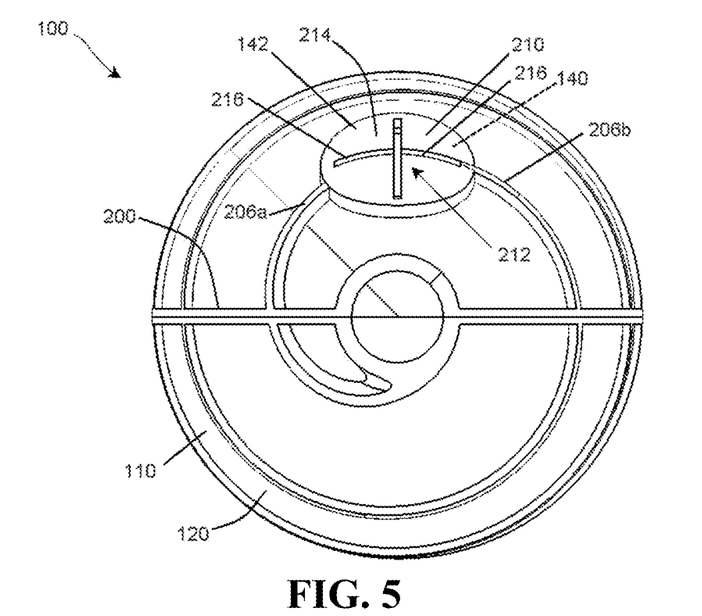
FIG. 5 is a front edge view thereof.
Figure 6:
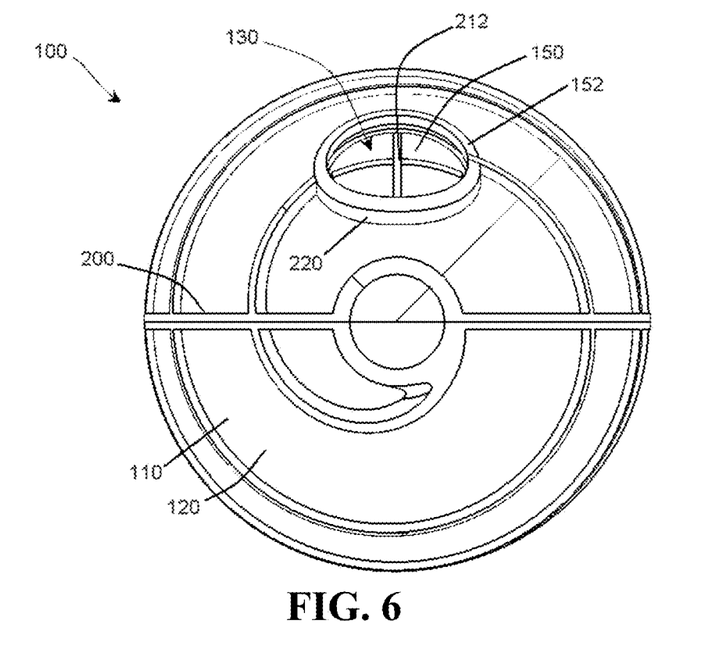
FIG. 6 is a rear edge view thereof.
Figure 7:
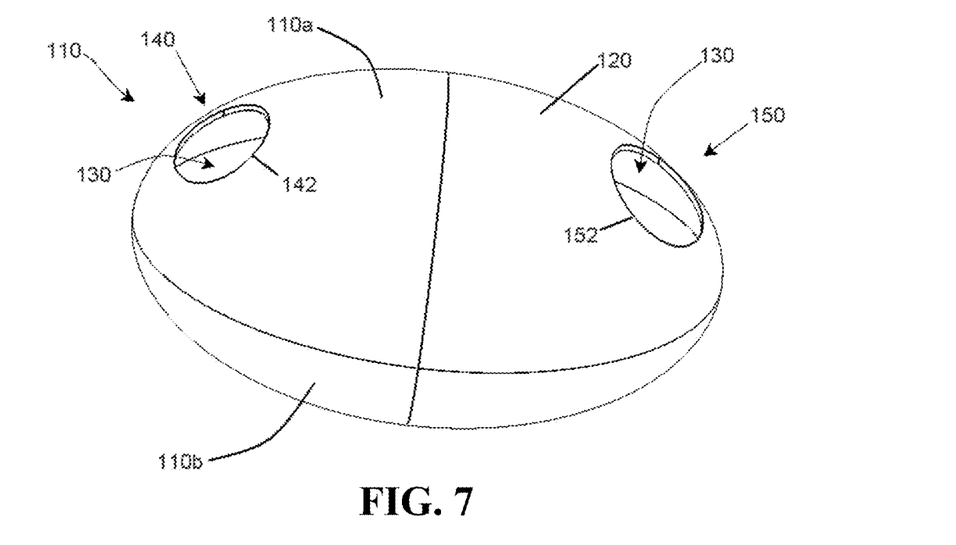
FIG. 7 is one embodiment of the body of the pet toy of the present disclosure.
Figure 8:
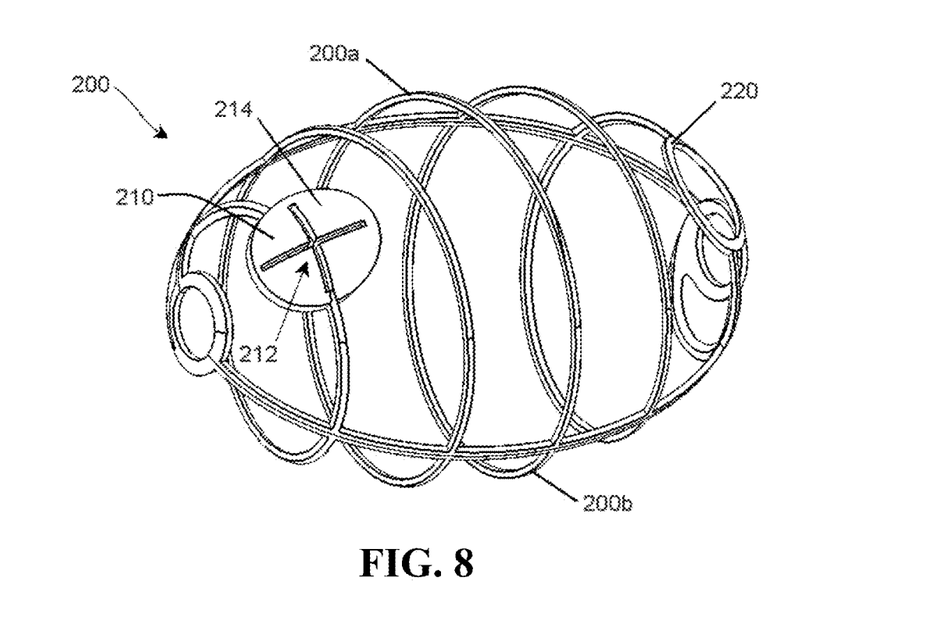
FIG. 8 is one embodiment of the overmold of the pet toy of the present disclosure.
Figure 9:
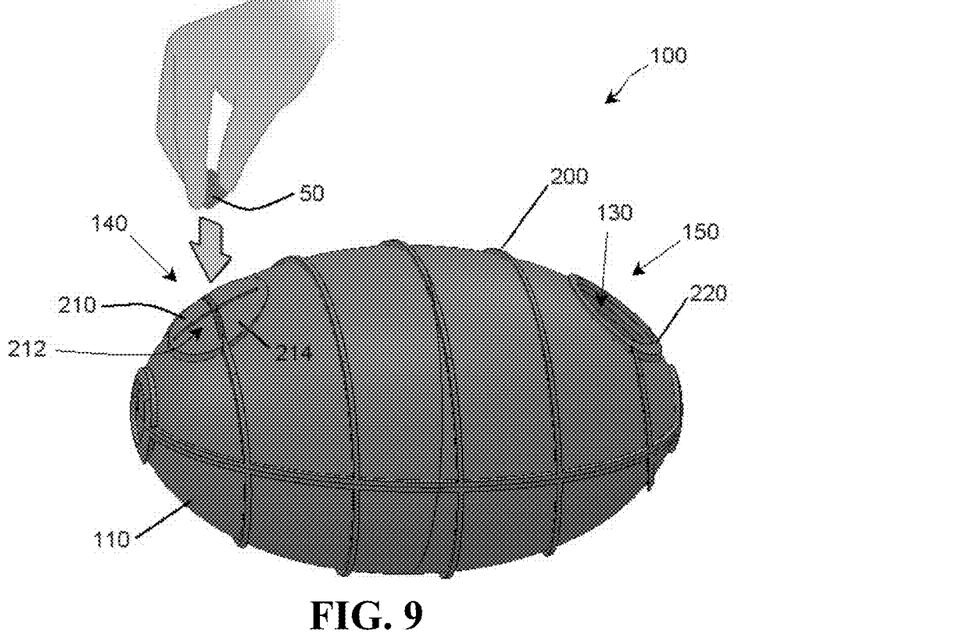
FIG. 9 illustrates the insertion of a treat into the pet toy.
Figure 10:
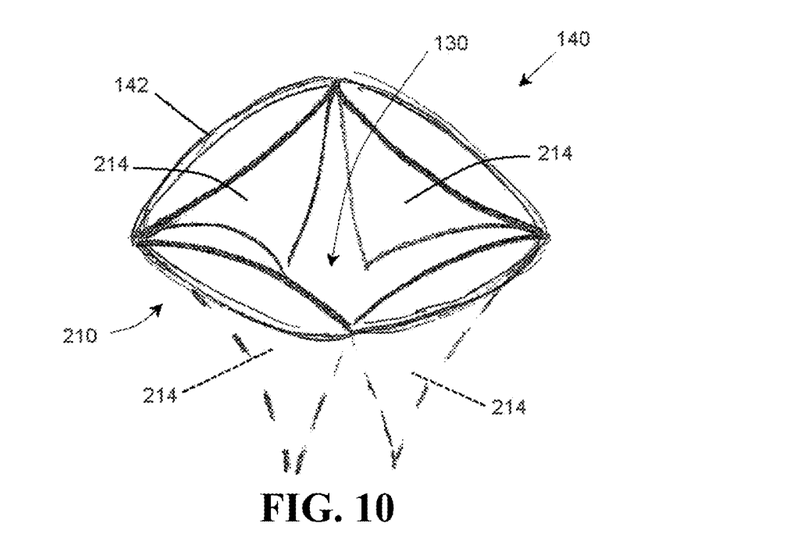
FIG. 10 illustrates one embodiment of a passage defined by inwardly deflectable living flaps formed from a portion of the overmold.
Figure 11:
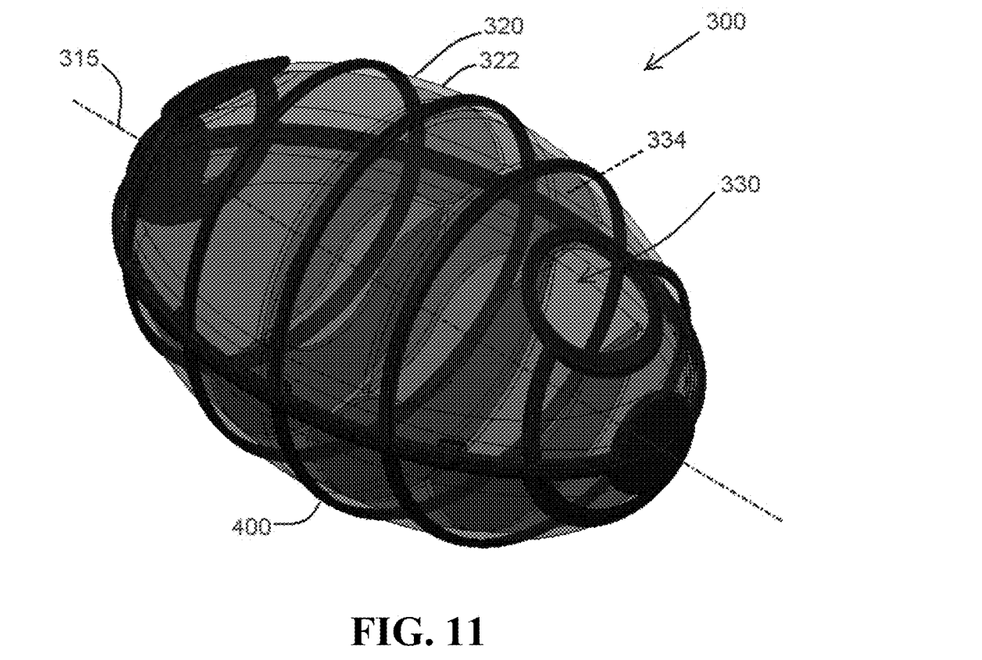
FIG. 11 is one embodiment of a front perspective view of an overmolded pet toy of the present disclosure.
Figure 12:
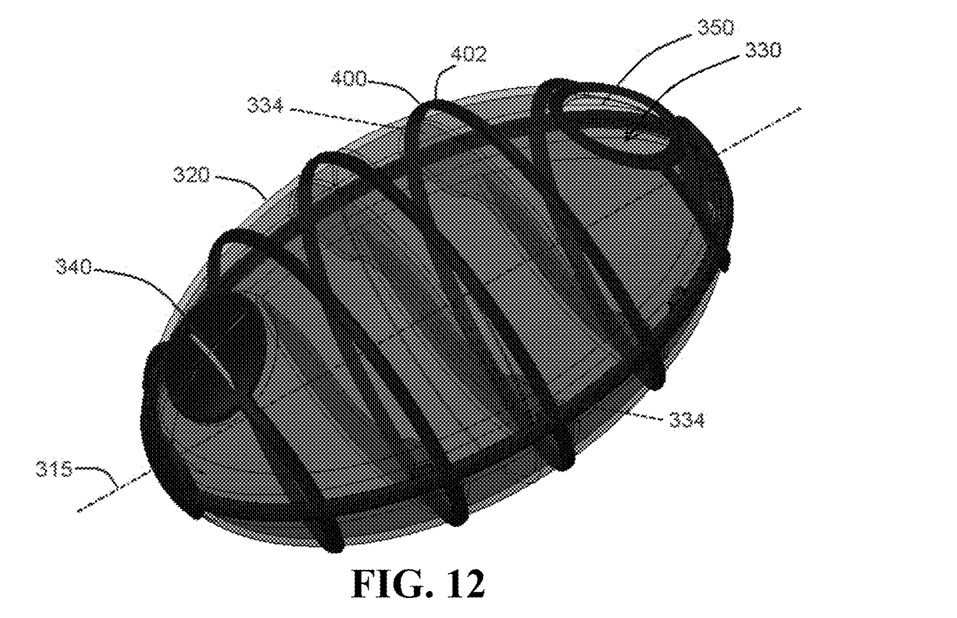
FIG. 12 is a rear perspective view thereof.
Figure 13:
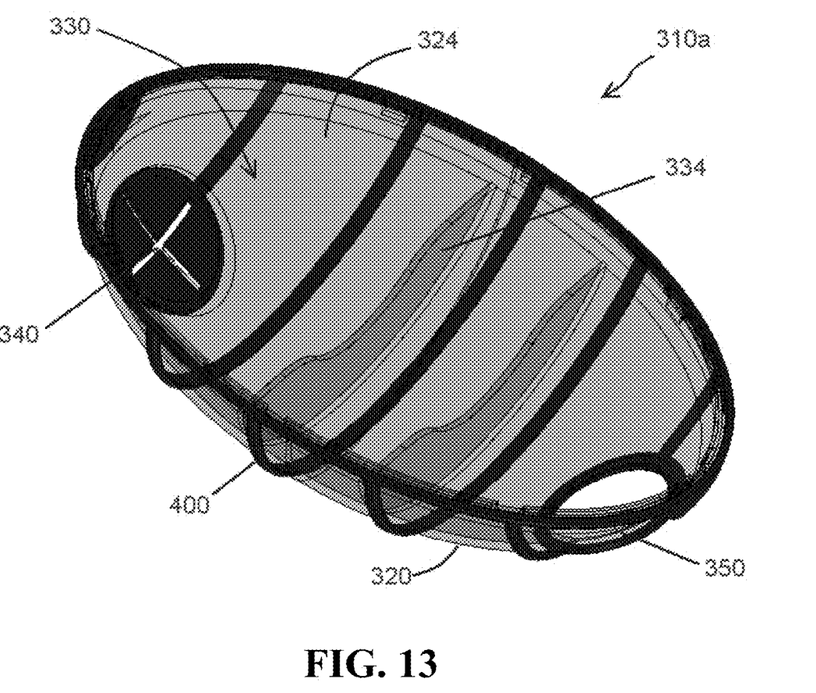
FIG. 13 is one embodiment of a top half of the toy of FIG. 11.
Figure 14:
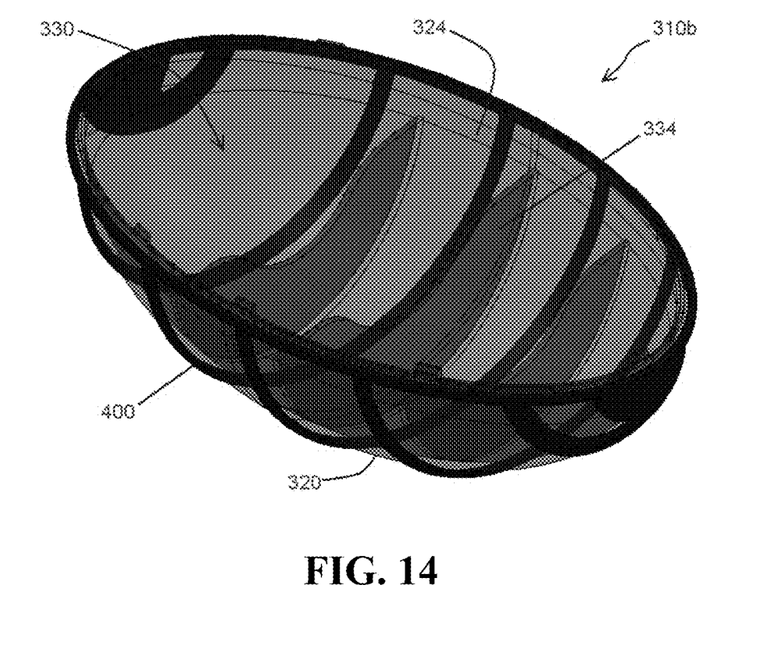
FIG. 14 is one embodiment of a bottom half of the toy of FIG. 11.

The first portion 210 of the overmold 200 further comprises an inwardly deflectable passage 212 for providing access to the interior 130 therethrough, where in the illustrated embodiment such passage 212 further comprises a least one, and preferably a plurality of living flaps 214 that are each inwardly deflectable relative to a periphery 142 of the first opening 140 (FIG. 10). In the illustrated embodiment, the plurality of living flaps 214 form a continuous ring around the periphery 142 of the first opening 140, and are inwardly deflectable toward the interior 130 when a treat 50 or the like is pushed therethrough (FIG. 9), with such flaps 214 returning to their original undeflected state thereafter. The first portion 210 of the overmold 200 preferably functions like a one-way valve that allows treats 50 to be pushed into the interior 130, but resists the return passage of the treats 50 from the interior 130. Instead, the second opening 150, which is preferably substantially unoccluded by the overmold 200, allows for easier passage of the treats 50 from the interior 130 during animal play or otherwise. While the illustrated embodiment shows a plurality of triangular-shaped flaps 214, it will be appreciated that other shapes and configurations of the flaps and/or passage configuration are possible.

Thus, there is provided an insertion passage 212 that is formed from a portion 210 of an overmold 200 that substantially surrounds the outer surface 120 of the pet toy 100. Such portion 210 of the overmold 200, and in particular certain openings 216 in the passage 210, also creates the appearance of a continuation of the overmold 200 as shown, for example, in FIG. 5, where the certain openings 216 follow the shape and contour of the bordering portions 206a and 206b of the overmold 200. By forming the passage 212 from the overmold 200, a manufacturer is able to modify the flexibility of the living flaps 214 and overall construction of the passage 212 by modifying the overmold 200 rather than the body 110.

FIGS. 11-16 illustrate an alternate embodiment of a pet toy 300 having a body 310 with a longitudinal axis 315, an outer surface 320 formed from a first material 322, an inner surface 324 defining an interior 330, a plurality of arcuate and preferably arch-shaped baffles 334 extending inwardly from the inner surface 324 toward the longitudinal axis 315, a first opening 340 in the outer surface 320 of the body 310 provided for the insertion of treats 50 (FIG. 9) into the interior 330, a second opening 350 in the outer surface 320 provided for the dispensing of treats 50 from the interior 330, and an overmold 400 formed from a second material 402 that is supported by the body 310. While first and second openings 340 and 350 are described and are generally constructed in accordance with the first and second openings 140 and 150 of the embodiment of FIGS. 1-10, they will not be described in detail herein, and other configurations are possible including having only one opening (not shown) or having more than two openings (not shown).

In a preferred embodiment, the body 310 is formed from a first material 322 that is harder that the second material 402 forming the overmold 400 for providing a structural foundation for the overmold 400. In one non-limiting embodiment, the body 310 is formed from a thermoplastic that is relatively hard, such as polypropylene for example, while the overmold 400 is formed from a softer material 402 such as a thermoplastic elastomer (TPE), for example, with a lower durometer than that of the body 310. Other materials are possible. A softer overmold 400 is useful for gripping and handling by the pet owner, and also assists with bouncing if the toy 300 is thrown or dropped. A softer material also absorbs an impact better than a harder material, which may extend the life of the toy 300. While is it preferable that the first and second materials 322 and 402 are different in composition and appearance, such materials may have the same composition with a different appearance, or such materials may have the same composition and appearance. Other variations are possible.

In one embodiment, the body 300 is initially manufactured in two halves 310a and 310b (FIGS. 13 and 14) that are joined such as by sonic welding, for example, although more than two body segments may be used during the construction of the body if desired. Other methods of joining, such as with an epoxy, adhesive or the like, are also possible. The overmold 400 may be similarly formed in two halves (see, for example, FIG. 8) and respectively applied to the body halves 310a and 310b prior to joining, although more than two segments may also be used if desired. Alternatively, the overmold 400 may be applied to the body 300 in a single molding step. Other methods of manufacture are possible. In the illustrated embodiment, the overmold 400 preferably creates the appearance of a framework version of the body 310 that extends both laterally and longitudinally around the body 310. In the illustrated embodiment, the overmold 400 exhibits the shape of a spiral, which in indicative of a spiral path 336 through which the treats 50 may travel as will be described below. In other embodiments (not shown), the overmold 400 may exhibit a different shape relative to the body 310.

Figure 15:
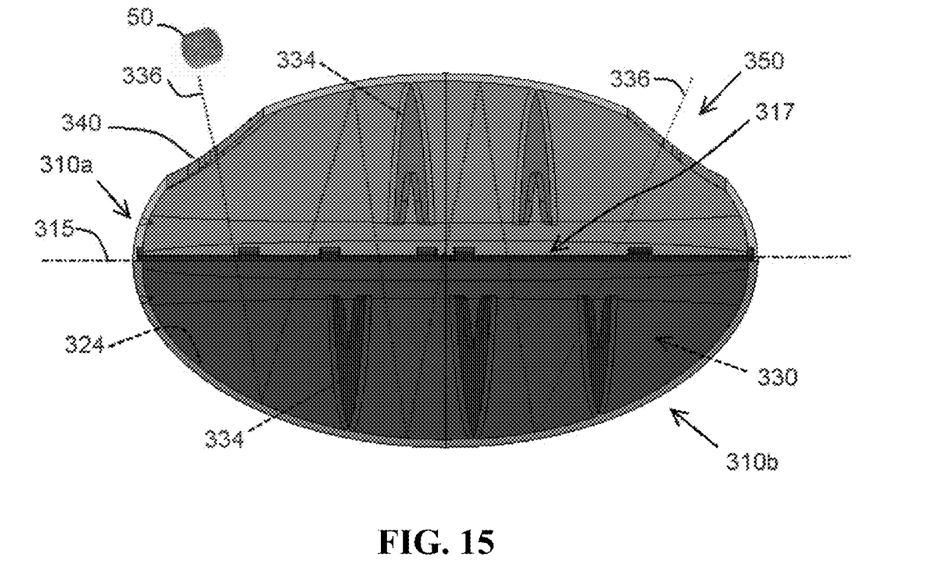
FIG. 15 is one embodiment of a side view of the toy of FIG. 11 with the overmold removed for purposes of explanation.
Figure 16:
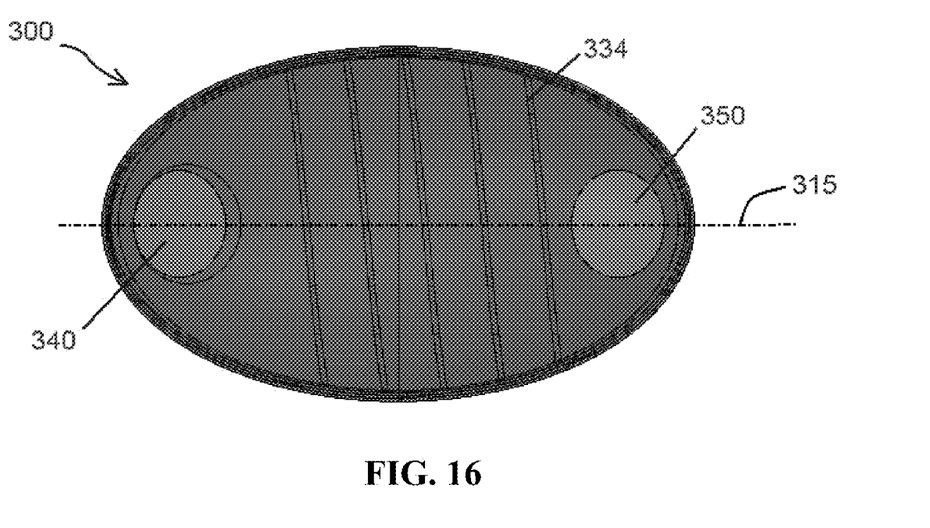
FIG. 16 is one embodiment of a top view of the toy of FIG. 11 with the overmold removed for purposes of explanation.

As shown in FIGS. 15 and 16, with the overmold 400 removed for purposes of convenience, the plurality of spaced-apart baffles 334 are diagonally arranged relative to the longitudinal axis 315 so as to form a spiral path 336 (FIG. 15) through which a treat 50 inserted into the first opening 340 travels. The baffles 334 on each body half 310a and 310b (see FIGS. 13 and 14) are preferably only connected to the inner surface 324 and not to each other, thus leaving open a central channel 317 (FIG. 15) along the longitudinal axis 315 of the toy 300 for the passage of a treat 50. The diagonal and spaced-apart arrangement of the baffles 334 relative to the longitudinal axis 315 thus creates a spiral, baffled passage through the interior 330. The spaced-apart baffles 334 also function to retain treats 50 therebetween during rotation of the toy 300 along a surface.

A treat 50 initially inserted into the interior 330 will fall onto the inner surface 324 and come to rest on the inner surface 324 and/or against one of the baffles 334. Thereafter, rotation of the toy 300 along a surface will cause the treat 50 to move around the baffles 334 and eventually advance out of the opening 350 on the other side of the toy 300. The arch-shaped configuration of the baffles 334 aids in retaining treats 50 during rotation of the toy, while the open central channel 317 defined between the openings in the arches of the baffles 334 enables the treats 50 to advance from one end of the toy 300 to the other, and from opening 340 to opening 350. However, because the baffles 334 are not integrally connected to each other, a treat 50 will move erratically through the toy, impacting various baffles 334 and the inner surface 324 on its journey toward opening 350. If the baffles 334 were connected to each other to form a continuous spiraled baffle, a treat would likely slide along the spiraled baffle and the noise generated by rolling the toy along a surface would not likely be as great or as random, and therefore not as enjoyable to a pet.

Figure 17:
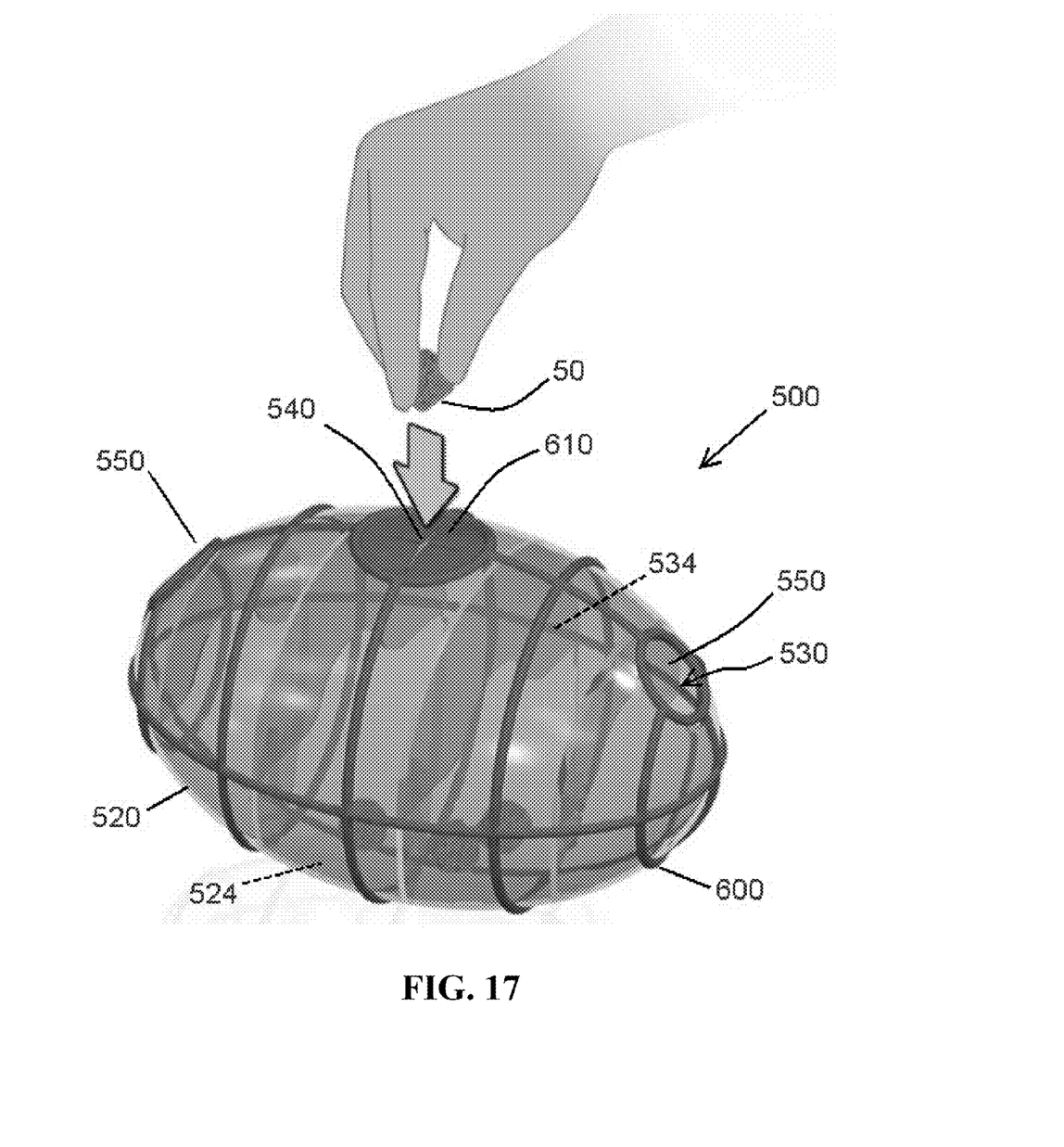
FIG. 17 illustrates one embodiment of an overmolded pet toy of the present disclosure with a treat being inserted therein.
Figure 18:
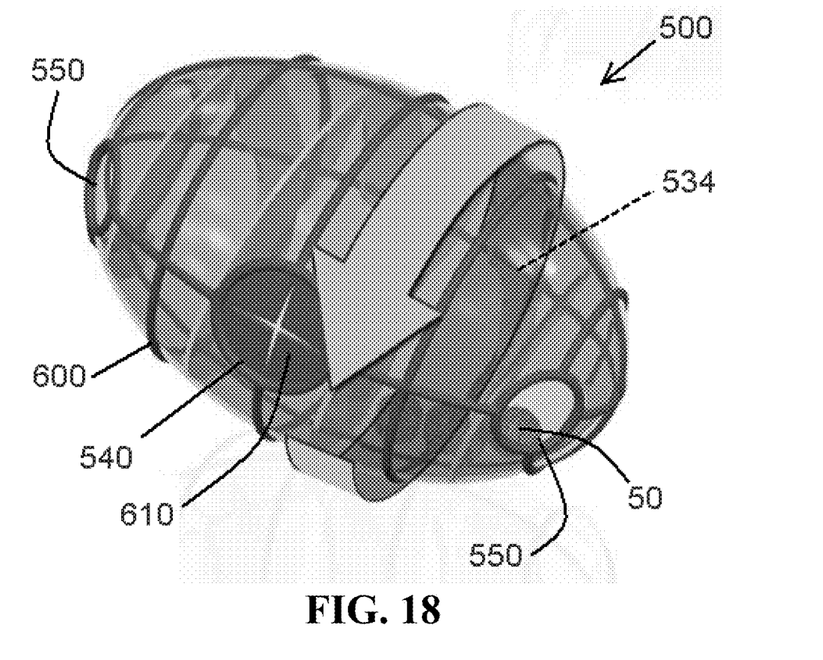
FIG. 18 illustrates the pet toy of FIG. 17 being rotated along a surface.
Figure 19:
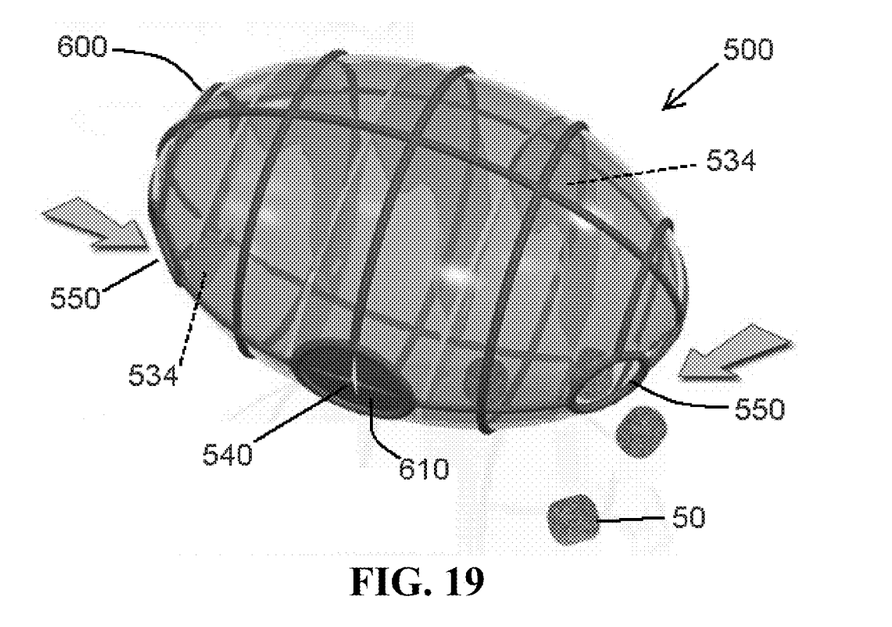
FIG. 19 illustrates the pet toy of FIG. 17 dispensing treats.

FIGS. 17-19 illustrate yet another embodiment of a pet toy 500 having a body 510, an outer surface 520 formed from a first material, an inner surface 524 defining an interior 530, a plurality of arcuate and preferably arch-shaped baffles 534 extending inwardly from the inner surface 524, a first opening 540 in the outer surface 520 of the body 510 provided for the insertion of treats 50 into the interior 530, a plurality of second openings 550 in the outer surface 520 provided for the dispensing of treats 50 from the interior 530, and an overmold 600 formed from a second material that is supported by the body 510. Instead of treats 50 being inserted along one end of the toy, as in opening 340 of FIGS. 11-16, and then traveling to an opposite end of the toy, as in opening 350 of FIGS. 11-16, in the embodiment of FIGS. 17-19, treats 50 are inserted in the toy 500 through the centrally-located first opening 540 that is configured to function as a one-way valve by virtue of a resilient portion 610 of the overmold 600 extending substantially over the first opening 540, and such treats 50 can be dispensed from either end of the toy 500 through either of openings 550 depending on which way the pet rolls the toy 500 along a surface (FIG. 19). Thus, if the pet rolls the toy 500 in one direction, a treat 50 inserted into the interior 530 will tend to travel through the baffles 534 along the spiral path toward the opening 550 consistent with such direction of roll.

A treat initially inserted into the interior 530 will fall onto the inner surface 524 and come to rest on the inner surface 524 and/or against one of the baffles 534. Thereafter, rotation of the toy along a surface will cause the treat 50 to move around the baffles 534 and eventually advance out of one of the openings 550. The arch-shaped configuration of the baffles 534 aids in retaining treats 50 during rotation of the toy, while an open central channel defined between the openings in the arches of the baffles 534 enables the treats 50 to advance from the center of the toy 500 to one end or the other, and from centrally-located opening 540 to one of openings 550 on either end. However, because the baffles 534 are not integrally connected to each other, a treat 50 will move erratically through the toy, impacting various baffles 534 and the inner surface 524 on its journey toward one of openings 550. If the baffles 534 were connected to each other to form a continuous spiraled baffle, a treat would likely slide along the spiraled baffle and the noise generated by rolling the toy along a surface would not likely be as great or as random, and therefore not as enjoyable to a pet.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A pet toy comprising: a) a body having an outer surface, an interior and at least one opening in the outer surface extending into the interior; b) an overmold supported by the body; and c) a portion of the overmold extending substantially over the at least one opening and further comprising an inwardly deflectable passage to provide access to the interior therethrough.

2. The pet toy of claim 1, wherein the portion of the overmold further comprises at least one living flap that is inwardly deflectable relative to the at least one opening.

3. The pet toy of claim 2, further comprising a plurality of living flaps.

4. The pet toy of claim 3, wherein the at least one opening further comprises a periphery and wherein the plurality of living flaps are supported by the periphery.

5. The pet toy of claim 4, wherein the plurality of living flaps form a continuous ring around the periphery.

6. The pet toy of claim 1, wherein the overmold extends both laterally and longitudinally around the body.

7. The pet toy of claim 1, the body further comprising at least one additional opening having an additional periphery, the overmold extending along the additional periphery.

8. The pet toy of claim 7, the at least one additional opening being unoccluded by the overmold.

9. The pet toy of claim 1, wherein the outer surface is formed from a first material and the overmold is formed from a second material that is different from the first material.

10. The pet toy of claim 9, wherein the second material is softer than the first material.

11. The pet toy of claim 1, wherein a portion of the inwardly deflectable passage follows the contour of the overmold.

12. The pet toy of claim 1, the interior further comprising a plurality of baffles.

13. The pet toy of claim 12, wherein the plurality of baffles are diagonally arranged relative to a longitudinal axis of the pet toy.

14. The pet toy of claim 13, wherein the plurality of baffles are arcuate.

15. The pet toy of claim 14, wherein the plurality of baffles further comprise spaced-apart arches.

16. The pet toy of claim 15, wherein the plurality of baffles extends inwardly from an inner surface of the body but do not intersect the longitudinal axis.

17. The pet toy of claim 16, further comprising a central channel along the longitudinal axis for the passage of treats.

18. A pet toy comprising: a) a body having a longitudinal axis, an outer surface, an inner surface, an interior, and at least one opening in the outer surface that extends into the interior, the body being structured to permit an animal foodstuff to be received through the at least one opening and into the interior but being structured to resist the animal foodstuff from returning from the interior through the opening; and b) a plurality of baffles attached to the inner surface; c) wherein a spiral-shaped path is created in the interior.

19. The pet toy of claim 18, wherein the plurality of baffles are diagonally arranged relative to the longitudinal axis.

20. The pet toy of claim 19, wherein the plurality of baffles are arcuate.

21. The pet toy of claim 20, wherein the plurality of baffles further comprise spaced-apart arches.

22. The pet toy of claim 21, wherein the plurality of baffles extends inwardly from the inner surface but do not intersect the longitudinal axis.

23. The pet toy of claim 22, further comprising a central channel along the longitudinal axis for the passage of treats.

24. The pet toy of claim 18, wherein the body has another opening formed therein that is structured to permit the passage of the animal foodstuff therethrough from the interior.

25. The pet toy of claim 24, wherein the another opening is situated generally at an end of the body.

26. The pet toy of claim 25, wherein the at least one opening is situated generally at another end of the body opposite the end at which the another opening is generally situated.

27. The pet toy of claim 18, wherein the body comprises at least one living flap that is inwardly deflectable relative to the at least one opening and that is structured to permit the animal foodstuff to be received through the opening and into the interior but being structured to resist the animal foodstuff from returning from the interior through the opening.

28. The pet toy of claim 27, wherein the body comprises an overmold that is situated generally at the outer surface, the overmold comprising the at least one living flap.

* * * * *